W. G. PEGG.
BRAIDING MACHINE.
APPLICATION FILED NOV. 27, 1914.

1,165,361.

Patented Dec. 21, 1915.
5 SHEETS—SHEET 2.

W. G. PEGG.
BRAIDING MACHINE.
APPLICATION FILED NOV. 27, 1914.

1,165,361.

Patented Dec. 21, 1915.
5 SHEETS—SHEET 3.

W. G. PEGG.
BRAIDING MACHINE.
APPLICATION FILED NOV. 27, 1914.

1,165,361.

Patented Dec. 21, 1915.
5 SHEETS—SHEET 4.

WITNESSES:
John C. Sanders
Albert F. Heuman

INVENTOR
William Geoffrey Pegg
ATTY.

UNITED STATES PATENT OFFICE.

WILLIAM GEOFFREY PEGG, OF LEICESTER, ENGLAND, ASSIGNOR OF ONE-HALF TO ARCHIBALD TURNER & CO. LIMITED, OF LEICESTER, ENGLAND.

BRAIDING-MACHINE.

1,165,361.  Specification of Letters Patent.  Patented Dec. 21, 1915.

Application filed November 27, 1914. Serial No. 874,245.

*To all whom it may concern:*

Be it known that I, WILLIAM GEOFFREY PEGG, a subject of the King of Great Britain, residing at Leicester, in the county of Leicester, England, have invented new and useful Improvements in or Relating to Braiding-Machines, of which the following is a specification.

This invention relates to braiding and like machines and to cords, ropes, lines, ligatures and the like produced thereon.

The invention concerns particularly a machine for plaiting threads to form cords, lines, and the like having a solid center without a core, such formation being eminently suitable for fishing lines.

In describing the invention, reference will be made to the accompanying drawings wherein a convenient construction of the improved machine is illustrated.

Figure 1:
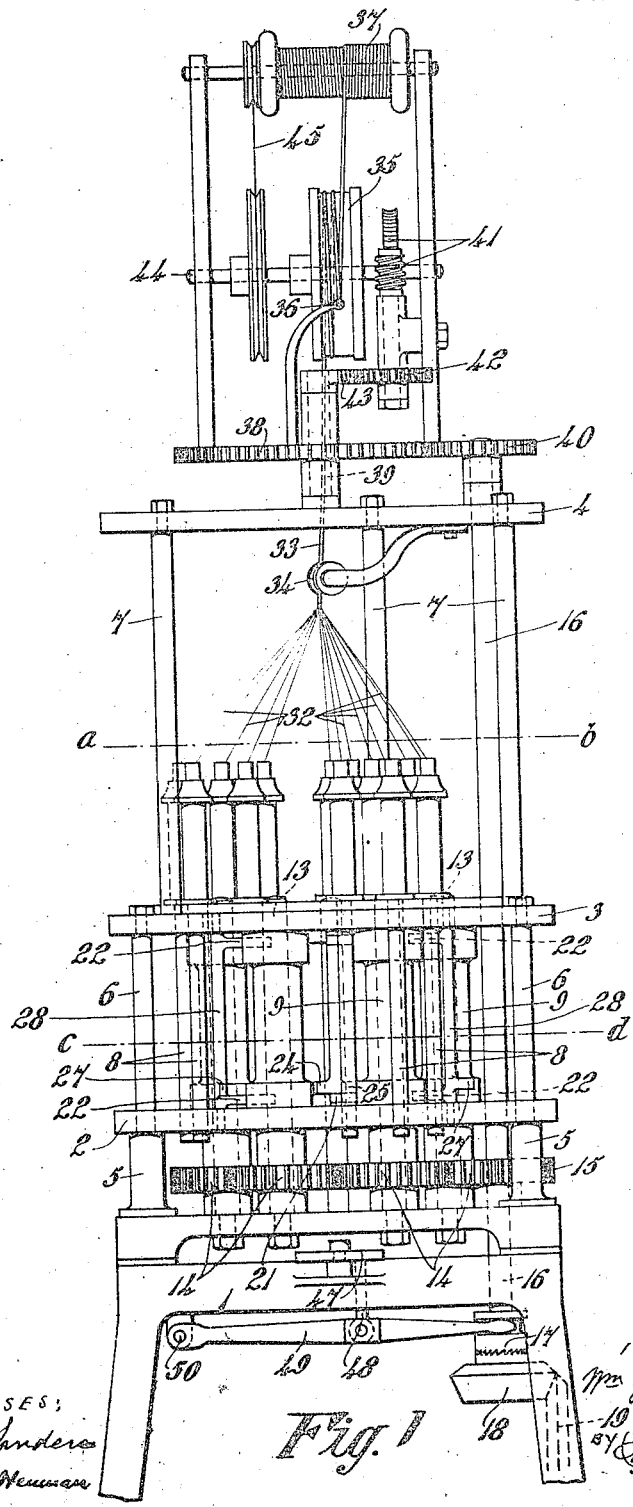
Figure 2:
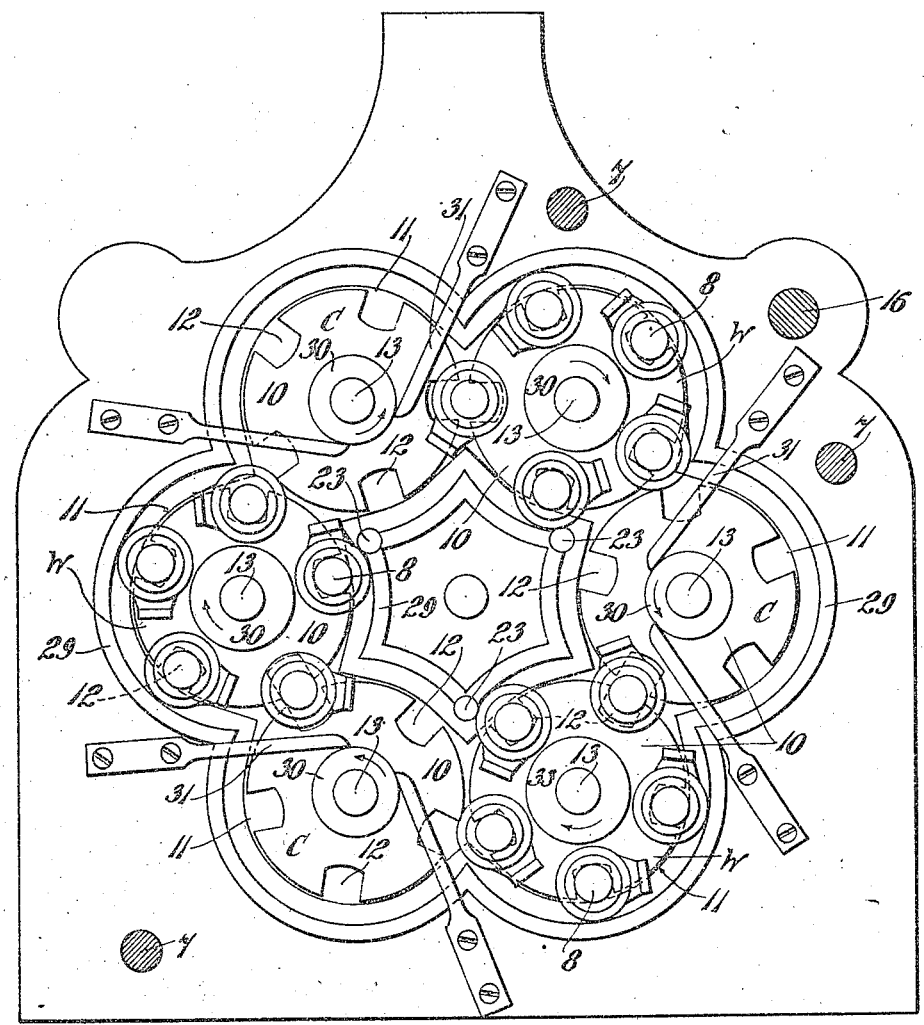
Figure 3:
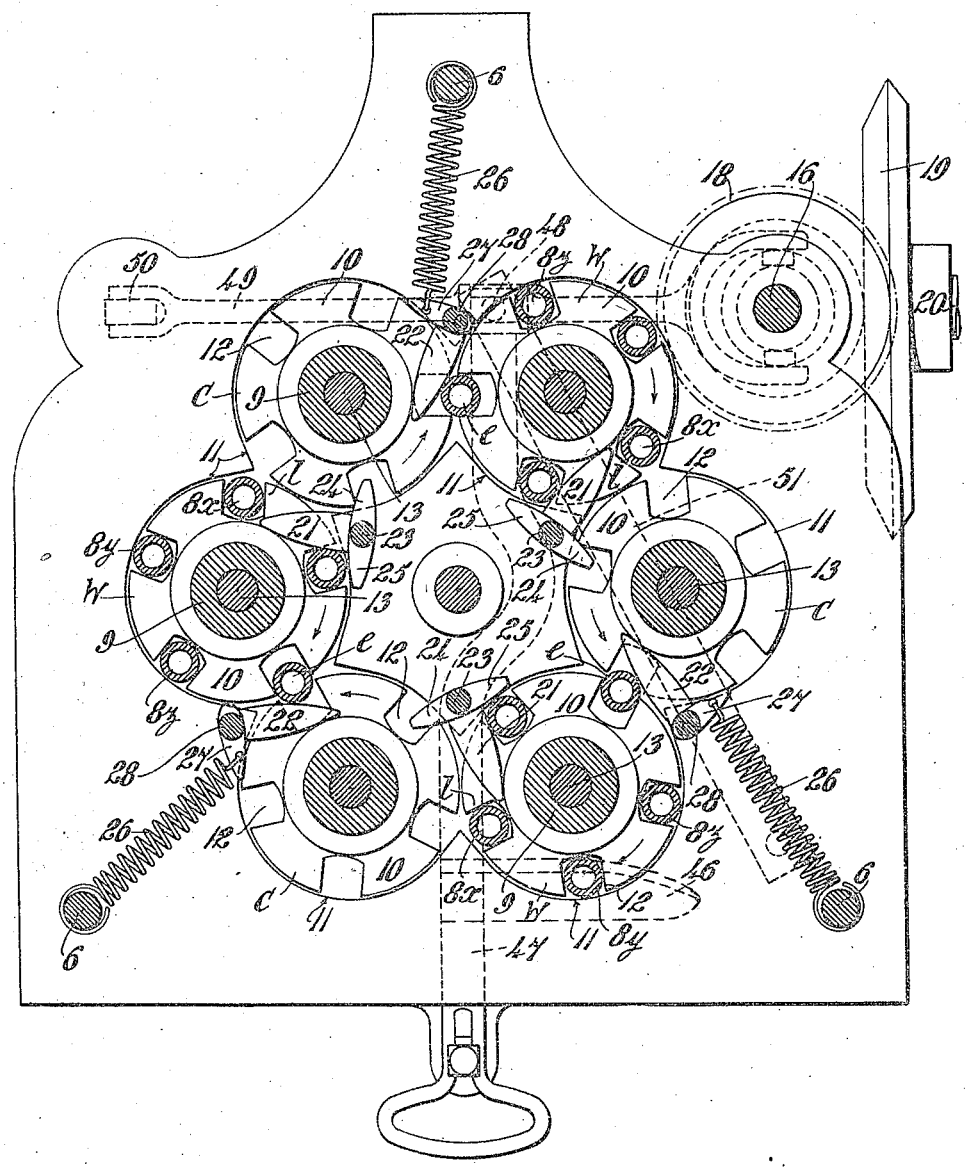
Figure 4:
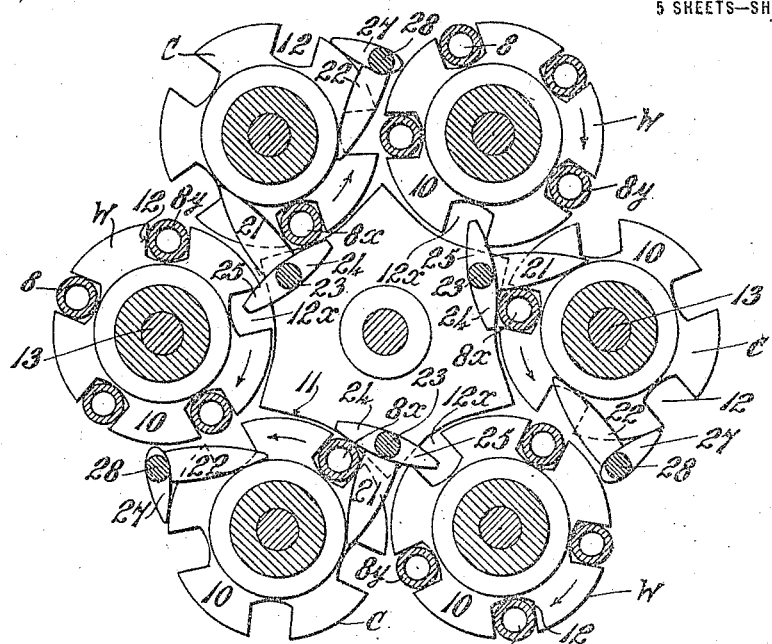
Figure 5:
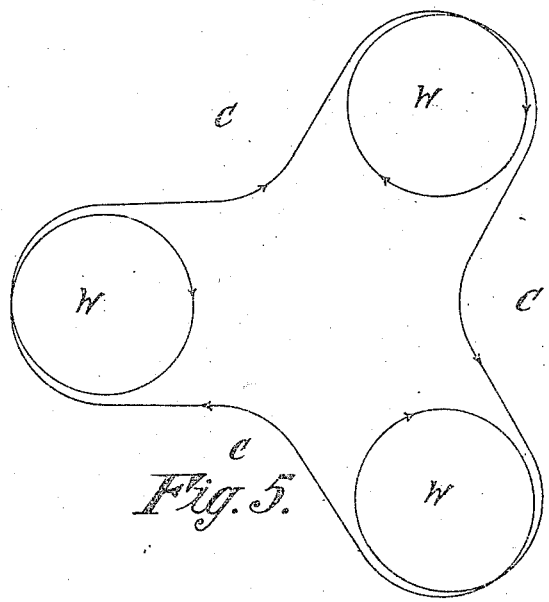
Figure 6:
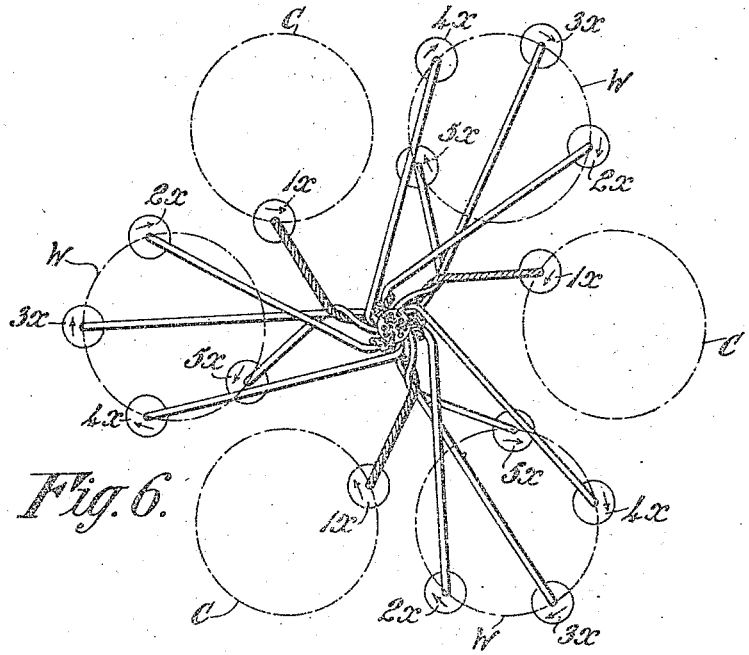
Figure 7:
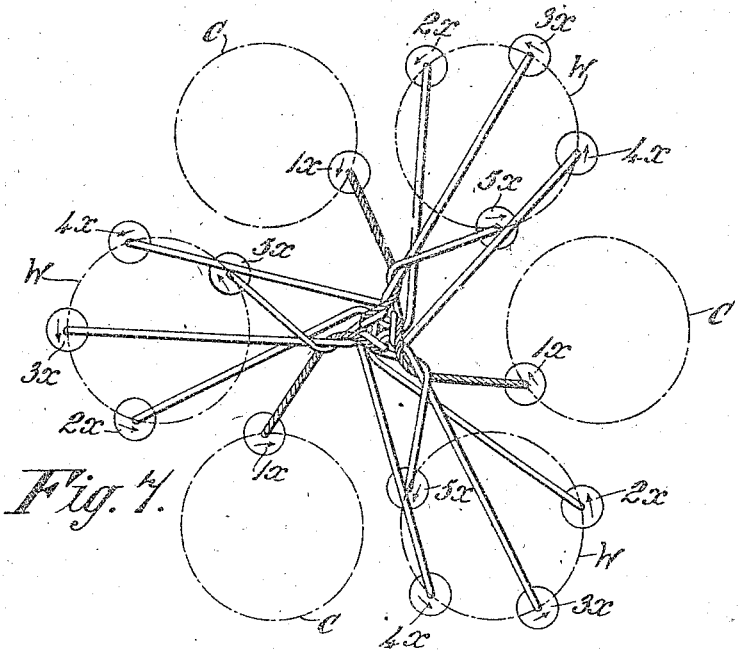

In drawings referred to:—Figure 1 is a front elevation of the machine. Fig. 2 is a sectional plan taken on the line $a$—$b$ of Fig. 1. Fig. 3 is a sectional plan taken on the line $c$—$d$ of Fig. 1. Fig. 4 is a similar view to Fig. 3 showing the spindles advanced the distance of one position. Fig. 5 is a diagram representing the path or track of the spindles. Fig. 6 is a diagrammatical plan view of showing threads (of exaggerated thickness) being twisted together according to this invention to form a cord. Fig. 7 is a similar view to Fig. 6 showing the reverse plan *i. e.* looking upward from under Fig. 6.

Fig. 1 is drawn to a smaller scale than the other figures and like parts are designated by the same reference characters throughout the drawings.

The machine illustrated comprises (Fig. 1) a framework consisting of a stand 1 and plates 2, 3 and 4 the latter being mounted upon the stand by distance bolts or rods 5, 6 and 7. The upper plate 4 supports the take up mechanism (hereinafter described) and the plates 3 and 2 have mounted therein the working heads W and carrier heads C. Three working heads and three intermediate carrier heads are provided, each head being constructed to accommodate five bobbin spindles. In all fifteen bobbin spindles 8 are used five in each working head as shown in Figs. 2 and 3.

The heads W and C consist of a central boss or tubular body part 9 (Fig. 1) having at each end a flange or disk 10 (Figs. 2 and 3) situated in openings 11 in the plates 2 and 3 and having in their peripheries radial slots or openings 12 for the reception of the spindles 8.

The heads W and C are rotatable upon fixed spindles 13 secured in the stand 1 and are driven in the direction of the arrows in Fig. 2 by gears 14 (Fig. 1) which mesh with each other in succession all around the machine and receive motion from a driving gear 15 (Figs. 1 and 3) on a vertical shaft 16 actuated by a clutch 17 and bevel wheels 18, 19 from a main driving shaft 20.

It will be understood that the radial slots 12 in the flanges 10 of each head are in alinement with each other so that the bobbin spindle 8 which enters the slots will be maintained upright.

By reference to Figs. 2 and 3 it will be observed that the spindles 8 are prevented from leaving the radial slots 12 of the flanges 10 by the adjacent sides of the openings 11 except at and near those points where the periphery of each flange approaches those of the adjacent heads. At these localities the peripheries of the flanges 10 are exposed to each other so that when necessary the bobbin spindles 8 can be transferred from the slots of one head to those of the next adjacent head in the manner shown in Fig. 3.

The traverse of the bobbin spindles 8 around the machine will be best understood by reference to Figs. 3, 4 and 5. The function of each carrier head C is to carry the bobbin spindles from one working head W to the next, the spindles entering the working head on one side thereof, indicated at $e$ Fig. 3, and after being carried around thereby for one complete revolution and part of another, leaving on the side $l$ opposite to that where they entered. The spindles 8 on leaving the working heads W enter the carrier heads C and by passing around therein for part of a revolution thereof are transmitted to the next working head. The spindles 8 leave the working heads alternately one after another. For instance in Fig. 3 the spindle $8^x$ is about to leave the head W, the following spindle $8^y$ will be carried around by the head, the next spindle $8^z$ will leave at the point $l$ and the spindle just entering from the carrier head C will be carried around. This same arrangement of alternation in leaving occurs simultaneously at all the working heads W as will be understood by reference to Fig. 4 where the spindles are shown a little advanced from the position shown in Fig. 3. In the position shown in Fig. 4 the spindles $8^x$ have left the working heads W and are being transmitted by the carrier heads C to the next working heads and the following spindles $8^y$ will be carried around past the exit point $l$ by the working heads. The slots $12^x$ in the working heads vacated by the spindles $8^x$ which are being transmitted by the advance carrier heads to the next working heads, come around to receive from the rear carrier heads the spindles $8^x$ they are bringing forward.

Briefly stated, the operation is that the spindles at each working head W are alternately carried around and shunted, the result being that each spindle during its complete revolution around the machine traverses the path diagrammatically represented in Fig. 5. In this figure the positions of the working heads W and carrying heads C are indicated by the respective reference characters to enable the course of the bobbins to be followed in Figs. 3 and 4. By superposing Figs. 5 and 3 or 5 and 4 the course of the bobbins in Figs. 3 and 4 can be clearly traced.

For shunting or switching the bobbin spindles from one head to another a series of dogs or switch points is provided. These members consist of movable switch points 21 (Figs. 3 and 4) and stationary switch points 22. The points 21 are situated on the inside of the circular series of heads and in the region of the points of exit $l$ of the working heads W. Each member 21 is movable about a vertical axis 23 the opposite positions of the switch point being shown in Figs. 3 and 4 respectively. In the position shown in Fig. 3 the switch point 21 intercepts bobbin spindles as they approach and shunts or transfers them from the radial slots of the working head to the corresponding slots in the adjacent carrier head. In the position shown in Fig. 4, the switch point 21 allows the spindles to be carried around by the working head past the point of exit without being shunted to the carrier head.

The position of each movable switch point 21 is automatically changed during the operation of the machine and to this end each of the said members has combined with it or with its axis rod wings 24, 25 adapted to be actuated by the spindles 8 as they pass around in either the working or carrier heads. For instance when the dog or switch point 21 is in the position shown in Fig. 3 the approaching spindle $8^x$ is shunted from the working head W to the carrier head C as already described and as this shunted spindle is carried around by the head C it makes contact with and moves the wing 24 projecting in its path thereby, as shown in Fig. 4, turning the switch point 21 from the shunting to the clear position so that the following spindle $8^y$ can be carried around by the working head. After passing the point of exit $l$ however, the spindle $8^y$ makes contact with and moves the opposite wing 25 projecting in its path thereby turning the switch point 21 back to the shunting position (Fig. 3) in time to intercept the next spindle $8^z$ and transfer it from the working head W to the carrier head C. Thus each bobbin spindle automatically sets the switch points or dogs 21 to direct the following spindles in the opposite direction.

The stationary switch points 22 are situated on the outside of the circular series of heads and in the region of the point of exit $l$ of the working heads W (see Figs. 3 and 4). These switch points are held in the position shown by springs 26 (Fig. 3) which are connected at one end to wings 27 to the axis members 28 of the switch points and at the opposite end to the distance rods or bolts 6. As clearly shown in Fig. 3 these stationary switch points intercept the bobbin spindles as they are carried around by the carrier heads C and shunt or transfer them from the radial slots 12 of the said heads to the corresponding slots of the adjacent working heads W.

The shunting devices or dogs 21, 22 are mounted at opposite ends in the plates 2 and 3 as shown in Fig. 1, a switch point in each case being provided at the top and bottom of the axis member to engage the bobbin spindles in two places simultaneously $i.\ e.$ in the locality of the flange or disk 10 of each head. The wings 24, 25 and 27 may be provided at the bottom end only of the shunting devices.

To prevent the bobbin spindles 8 from twisting or turning around during their traverse the plate 3 has upstanding rims 29 (Fig. 2) surrounding the openings 11. These prevent the bobbins turning in one direction while the bosses 30 of the heads W and C prevent them turning in the other direction. Guides 31 are fixed to the plate 3 to prevent the spindles twisting during the time of their transference from one working head to the next.

The threads 32 (Fig. 1) from the bobbin spindles 8 are drawn up and as they are plaited together the resultant cord or the like 33 guided by a pulley 34 passes up to and around a friction drum 35 and from thence through a guide 36 to a bobbin 37 upon which it is wound. The whole of the take up mechanism is mounted upon a wheel 38 adapted to rotate upon a boss 39 on the top plate 4. The wheel 38 is driven by a pinion 40 on the beforementioned vertical driving shaft 16 the speed of rotation of said wheel being uniform with that of the traverse of the bobbin spindles 8 so as to avoid twisting of the cord during its manufacture. The take up drum 35 is driven by a worm gear 44 which is intermittently actuated by the engagement of a gear wheel 42 with a fixed toothed segment 43 as the mechanism revolves. The bobbin 37 is rotated from the shaft 44 by a belt 45.

The bobbin spindles are preferably of the usual well known construction provided with thread controlled dropping weight for automatically stopping the machine when any thread breaks. The dropped weight of any spindle makes contact with and moves a plate 46 (Fig. 3) attached to a slide bar 47, movement of the latter releasing a vertically slidable pin 48 (Figs. 1 and 3) connected with a horizontal lever 49 fulcrumed at 50. Upon release of the pin 48 the said lever is moved upward by the pressure of a blade spring 51 thereunder (shown by dotted lines in Fig. 3) and disconnects the clutch 17 to stop the machine. The end of the slide bar adjacent the pin 48 is beveled on the underside or is suitably formed to depress the said pin when the bar is pushed inward thereby through the medium of the lever 49 putting the clutch into action to start the machine.

It is found simplest as regards construction to arrange the shafts or spindles 13 of the heads W and C vertically, the bobbin spindles likewise having a vertical disposition. The said shafts may, however, if desired, be disposed at an inclination to the vertical, their upper ends leaning toward each other. If this convergent arrangement is adopted, the bobbin spindles in opposite heads will likewise assume and work in an inclined position as will be understood.

While the hereindescribed number of working heads is found convenient and suitable it is to be understood that a greater number of such heads may be employed with, of course, a corresponding increase in the number of intermediate carrier heads, the bobbin spindles being transferred from one working head to another as previously described. Also the number of bobbin spindles carried by each working head may be varied so long as an odd number are used. For instance each working head may have accommodation for three, five, seven, nine, eleven or any higher odd number of spindles within reason the spindles leaving the heads in alternation as hereinbefore described.

The result of the hereinbefore described motions of the bobbin spindles as regards the formation of the cord will be best seen by reference to Figs. 6 and 7 the numbers of working heads and spindles employed being respectively three and fifteen. For the sake of clearness, in these figures the working heads W and carrier heads C are represented by dotted line circles only, the direction of the travel of the spindles being indicated by arrows thereon. To enable the intertwining threads to be more readily distinguished, the threads of the spindles which are being transferred by the carrier heads are shaded. Bearing in mind the aforesaid principle of operation i. e. the spindles leave each working head in alternation, it will be understood that in the position shown in Figs. 6 and 7, the spindles $1^x$ having left the working heads, of the following spindles $2^x$ will be carried around by the working heads, $3^x$ will leave, $4^x$ will be carried around, and $5^x$ will leave. The result of this is that each thread is carried before its spindle leaves the working head to be wrapped or twisted around the next two alternate threads. For instance in the diagrams it will be seen that the thread of spindle $1^x$ is wrapped around the threads of spindles $3^x$ and $5^x$ the same result being brought about as each working head. The number of following threads engaged by each thread will depend upon the number of spindles in each working head. For instance by reason of the employment of five spindles in each head as shown, each thread engages the two alternate following threads. If however, three spindles were used in each head each thread would wrap around the next alternate thread; if each head had seven spindles, each thread would wrap around the following three alternate threads. A thread or cord formed according to the method of operating the present machine may therefore be said to be characterized by the fact that each of its threads is wrapped or twisted around the next alternate thread or threads and passes across the interior from one exterior point of the cord to another thereby compacting the cord and forming an integral approximately solid core. The combined effect of the engagement of each thread with one or more of the following alternate threads and the carrying of said thread across from a point on the circle to an opposite point is to draw the engaged thread or threads toward the center of the cord as shown in Fig. 7 thus almost entirely filling up the said center. The number of times each thread will appear on the surface of the cord during a complete revolution of the bobbins depends of course upon the number of working heads employed. With three working heads wherein each bobbin spindle is carried around twice as hereindescribed, each thread will show six times on the surface; with four heads each thread would appear eight times, and so on.

When the improved plaited or braided cord is to be used as fishing line it may be subsequently treated with shellac and linseed oil.

What I claim then is:

1. A braiding or cord making machine comprising, in combination, a series of bobbin spindles, a plurality of rotatory working heads, a corresponding series of intermediate carrier heads, said working and carrier heads being adapted to impart revolving traverse to the series of bobbin spindles, and a series of devices operating automatically to select the bobbin spindles in alternation in the working heads and shunt the selected spindles from the working heads to the carrier heads, the arrangement being such that each spindle is carried around more than once by each working head before being selected and shunted, for the purpose described.

2. A braiding or cord making machine comprising, in combination, a series of bobbin spindles, a plurality of working heads, a corresponding series of intermediate carrier heads, a series of stationary switch points arranged to intercept the traveling spindles and transfer them from the carrier heads to the working heads, a series of pivoted switch points adapted to intercept the traveling spindles and transfer them from the working heads to the carrier heads, and wings on said pivoted switch points adapted to be engaged and moved by passing spindles to change the position of the switch points substantially as and for the purpose described.

In testimony whereof I have signed my name to this specification in the presence of two subscribing witnesses.

WILLIAM GEOFFREY PEGG.

Witnesses:
  E. V. LEWIS,
  GEORGE LESTER.